United States Patent
Lipinski

(10) Patent No.: US 7,436,421 B2
(45) Date of Patent: Oct. 14, 2008

(54) APPARATUS AND METHODS FOR FORMING OPTICALLY VISIBLE MARKS ON A ROTATING MEDIA

(75) Inventor: Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 11/232,318

(22) Filed: Sep. 21, 2005

(65) Prior Publication Data

US 2007/0064085 A1    Mar. 22, 2007

(51) Int. Cl.
*B41J 2/435* (2006.01)
(52) U.S. Cl. .................................... 347/224
(58) Field of Classification Search ............ 347/2, 347/224–225; 369/100; 428/64.4; 711/113
See application file for complete search history.

(56) References Cited

U.S. PATENT DOCUMENTS

| | | | |
|---|---|---|---|
| 6,148,368 A * | 11/2000 | DeKoning | 711/113 |
| 6,862,033 B2 | 3/2005 | McClellan | |
| 7,084,895 B2 * | 8/2006 | McClellan et al. | 347/225 |
| 7,139,232 B2 * | 11/2006 | McClellan | 369/100 |
| 2004/0252142 A1 * | 12/2004 | Struk et al. | 347/2 |
| 2005/0013964 A1 * | 1/2005 | Van Brocklin et al. | 428/64.4 |
| 2006/0017754 A1 * | 1/2006 | Kwasny et al. | 347/2 |

OTHER PUBLICATIONS

U.S. Appl. No. 10/626,027, unpublished, McClellan.
U.S. Appl. No. 10/898,392, unpublished, Kwasny et al.

* cited by examiner

*Primary Examiner*—Hai C Pham

(57) ABSTRACT

An embodiment includes disposing optically visible marks along one or more spiral segments on a rotating medium, where the one or more spiral segments include a plurality of seams, and locating the seams at different angular locations on the rotating medium.

28 Claims, 3 Drawing Sheets

APPARATUS AND METHODS FOR FORMING OPTICALLY VISIBLE MARKS ON A ROTATING MEDIA

BACKGROUND

Labeling optical storage discs, such as (compact discs) CDs, (digital versatile discs) DVDs and the like, may be accomplished in various ways. An inkjet printer solution uses a Cartesian coordinate system and a horizontal scanning print head to apply ink to a specially coated disc media. A disadvantage of this approach is the requirement for a device separate from the optical drive to perform the printing and the high cost of the special media. Another technique forms marks on circular tracks. However, significant overhead delays for drive operations such as drive settling, etc., often occur between tracks, increasing the time required to label the disc.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
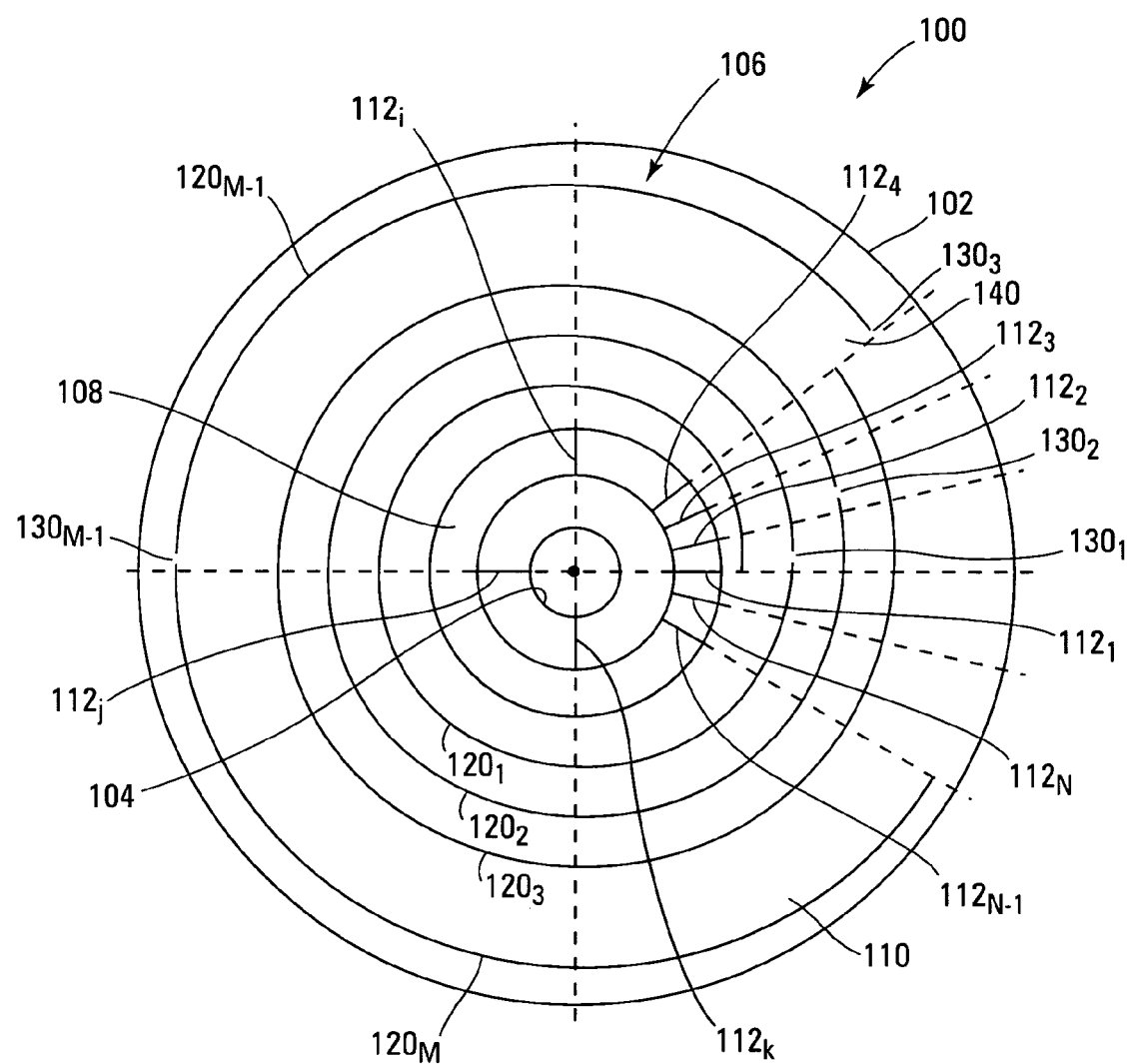
FIG. 1 illustrates an embodiment of a rotatable medium, according to an embodiment of the invention.

FIG. 1 illustrates a rotatable medium, such as an optical disc 100, e.g., a compact disc (CD), a digital versatile disc (DVD), etc., according to an embodiment. Disc 100 has an outer edge 102 and an inner edge 104. For one embodiment, inner edge 104 surrounds a hole passing through a center of disc 100. Disc 100 also includes a label side 106, shown in FIG. 1. For another embodiment, disc 100 includes a data side (not shown in FIG. 1) opposite label side 106.

For one embodiment, label side 106 includes at least a control feature region 108 and a writable region 110 located between control feature region 108 and outer edge 102. Note that the relative size of control feature region 108 is exaggerated in FIG. 1. For some embodiments, a number of radial tick marks (or spokes) 112 are located within control feature region 108 that are used for timing disc 100 for maintaining disc 100 at a predetermined rotational speed. Note that spokes 112 have been extended over writable region 110 using dashed lines that will be referred to below. For one embodiment, a dye coating is disposed on writable region 110. When light is directed onto the dye coating, the light produces a chemical change in the dye coating that produces a visible mark (or pixel) on writable region 110 that forms a portion of a label.

Optically visible marks or pixels, e.g., corresponding to label data, can be written on writable region 110 along spiral segments 120, as shown in FIG. 1. For one embodiment, each segment corresponds to one virtual track of label data, and for another embodiment, each segment includes one or more virtual tracks, where a virtual track may be defined as a 360 degree spiral segment. A number of pixels forming a segment is given by the segment length multiplied by the number of pixels per unit length. For some embodiments, the length of the segments may be such that they do not contain a whole number of pixels, but instead contain a fraction of a pixel in addition to the whole number of pixels. For other embodiments, fractional pixels may occur because of a pause in writing part way through writing a pixel. Various causes of writing pauses are discussed below.

In some embodiments, gaps (or seams) 130 occur between the end of a segment 120 and the start of a succeeding segment 120, e.g., seam $130_1$ occurs between the end of segment $120_1$ and the start of segment $120_2$. Seams 130 may occur as a result of a pause in writing the segments, as will be discussed subsequently in greater detail. Note that an individual segment 120, e.g., segment $120_1$, for one embodiment, ends at a spoke location, and the next individual segment 120, e.g., segment $120_2$, starts adjacent to that spoke location after a seam 130, e.g., seam $130_1$, that starts at that spoke location.

For another embodiment, seams 130 are misaligned with respect to each other. For some embodiments, the seam locations may be distributed according to a random pattern, Brownian pattern, a fixed pattern, e.g., based on a triangular wave, etc., or successive seams are formed at successive spoke locations, as shown in FIG. 1. Note that if seams 130 were aligned, they would act to produce a continuous seam that may be visible to an eye of an observer. This could detract from the appearance of the written label. Note further that the fractional pixels referred to above occur at an end of a segment 120 just before a seam 130 for another embodiment.

For other embodiments, a single spiral segment may be formed in one portion of writable region 110, e.g., a spiral segment corresponding segments $120_1$ to $120_3$, and a single spiral segment may be formed in another portion of writable region 110, e.g., a spiral segment corresponding segments $120_{M-1}$ to $120_M$, after leaving a blank region 140. Note that a writing pause may occur for blank region 140 that produces seam $130_3$. For one embodiment, a single spiral segment may cover the entire writable region 110.

Figure 2:
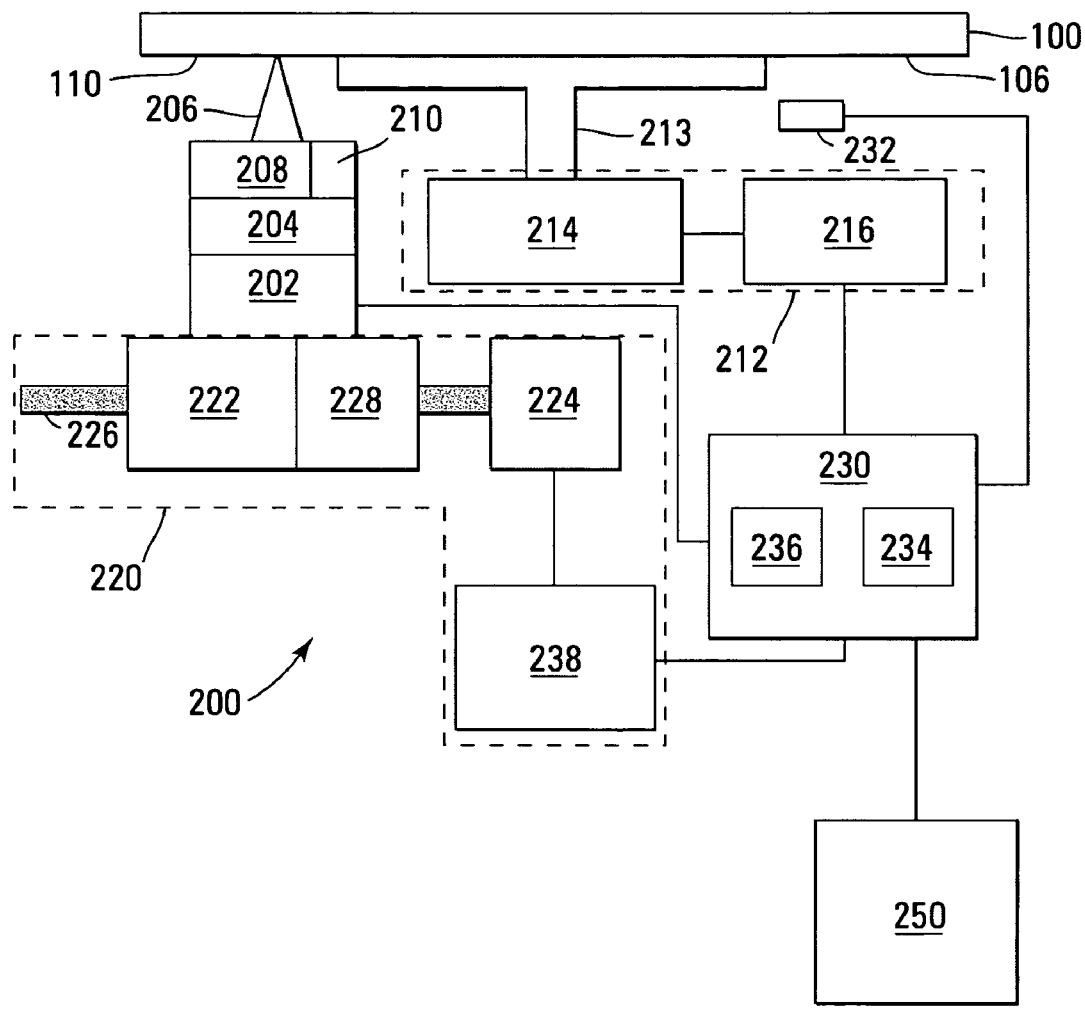
FIG. 2 is a block diagram illustrating an embodiment of an optical disc drive system, according to an embodiment of the invention.

FIG. 2 is a block diagram illustrating an optical disc drive system 200 as a portion of a disc-media marking device, according to an embodiment. Optical disc drive system 200 may be configured to produce visible marks on writable region 110 of label side 106 of optical disc 100. The disc media-marking device may be implemented as a stand-alone appliance device for labeling disc media or as part of an optical media player or drive, such as a writable compact disc (CD), a digital versatile disc (DVD) player, or the like.

Optical disc drive system 200 includes a marking mechanism 202 for writing optically visible marks or pixels on writable region 110 of label side 106. For one embodiment, marking mechanism 202 includes a light source 204, such as a laser, that produces a light beam 206, e.g., a laser beam. A focusing lens 208, e.g., an objective lens, of marking mechanism 202 focuses light beam 206 onto writable region 110. Marking mechanism 202 also includes an actuator 210 for moving lens 208 in and out of focus, i.e., toward or away from disc 100.

Optical disc drive system 200 includes a spindle mechanism 212 that includes a spindle 213, a spindle motor 214, and for one embodiment, a rotary encoder 216. A sled mechanism 220 is also included in optical disc drive system 200. Sled mechanism 220 has a sled 222 that carries marking mechanism 202. For one embodiment, a coarse-adjust motor 224, such as a stepper motor, provides a coarse adjustment for radial movement of sled 222 on a rail 226. For another embodiment, a fine-adjust motor 228, such as a voice coil motor, provides a fine adjustment for radial movement of sled 222 on rail 226. For another embodiment, sled mechanism 220 includes an encoder 238.

A controller 230 controls marking mechanism 202, spindle mechanism 212, and sled mechanism 220. A sensor 232 is included for sensing spokes 112. The sensed information is conveyed to controller 230 so that controller 230 can adjust the rotational speed of spindle motor 214 and thus of disc 100. For one embodiment, controller 230 starts and stops writing the spiral segments 120 at the spoke locations in response to sensor 232 sensing spokes 112. For another embodiment, controller 230 is coupled to a host 250, such as a main controller of a disc-media marking device, a computer that includes optical disc drive system 200, or the like.

For one embodiment, controller 230 includes a processor 236 for processing computer/processor-readable instructions. These computer-readable instructions are stored on a computer-usable media 234 and may be in the form of software, firmware, or hardware. As a whole, these computer-readable instructions are often termed a device driver. In a hardware solution, the instructions are hard coded as part of a processor, e.g., an application-specific integrated circuit (ASIC) chip. In a software or firmware solution, the instructions are stored for retrieval by the processor 236. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Most consumer-oriented computer applications are software solutions provided to the user on some removable computer-usable media, such as a compact disc read-only memory (CD-ROM).

In operation, for an embodiment, disc 100 is located on spindle 213 and spindle motor 214 rotates spindle 213 and thus disc 100 to given angular locations, e.g., in response to receiving signals from controller 230, where these signals are in response to controller 230 receiving signals from sensor 232 indicative of spokes corresponding to those angular locations. As disc 100 rotates, coarse-adjust motor 224 moves sled 222 radially to a predetermined radial location on writable region 110. During the coarse move, no segments 120 are written on writable region 110.

To form a spiral segment 120, fine-adjust motor 228, then moves sled 222 radially while a segment 120 is written on writable region 110 and while coarse-adjust motor 224 is inactive. However, fine-adjust motor 228, can only move sled 222 by small increments, e.g., about 10 spiral segments 120 for some embodiments. Therefore, when fine-adjust motor 228 reaches its full extent and cannot move sled 222 any further, the writing is paused so that coarse-adjust motor 224 can move sled 222 to the next radial location, e.g., that corresponds to the end of the preceding fine move, and fine-adjust motor 228 is reset to start moving sled 222 from this radial location. Writing commences when fine-adjust motor 228 starts moving sled 222. Note that writing pauses due to coarse sled moves. This acts to produce seams 130.

To account for the warping of the media, especially toward outer edge 102, the processor 236 instructs focus actuator 210 to continually or periodically move the lens 208, e.g. at each spoke location. After moving sled 222 over a particular radial distance, e.g., a radial distance corresponding to about 32 spiral segments 120 for some embodiments, processor 236 must pause printing and spend one or more full revolutions of disc 100 to characterize (or learn) the shape of the disc at the new radius to compensate for the warping. This procedure is referred to as a focus adaptation. Focus adaptations also cause pauses in writing that act to produce seams 130.

For one embodiment, controller 230 receives one write command from host 250 for writing each segment 120 (FIG. 1) on writable region 110. For another embodiment, controller 230 performs a double buffering operation so that after a first segment is written, data to be written to a second segment is ready so that the second segment can be written as soon as writing of the first segment is finished. Note that the data for the respective segments is received from host 250 at controller 230.

An example of double buffering, according to another embodiment, includes receiving second data at a second buffer of controller 230 while writing first data to a first segment, e.g., segment $120_1$ of FIG. 1, from a first buffer and assigning the second buffer to a second segment, e.g., segment $120_2$ of FIG. 1, contiguous to the first segment.

It should be noted that for various embodiments, controller 230 processes a write command received from host 250 at any time. Moreover, at each spoke location, controller 230 determines whether a coarse sled move and/or a focus adaptation should be made. If it is determined that a coarse sled move and/or a focus adaptation should be made, the coarse sled move and/or the focus adaptation is made before writing any data to the segment 120 that is to start at that spoke location. As indicated above, this produces a seam 130 between that spoke location and the start of the next segment. Failure of host 250 to send data to controller 230 also causes printing to pause and thus produces a seam 130.

Figure 3:
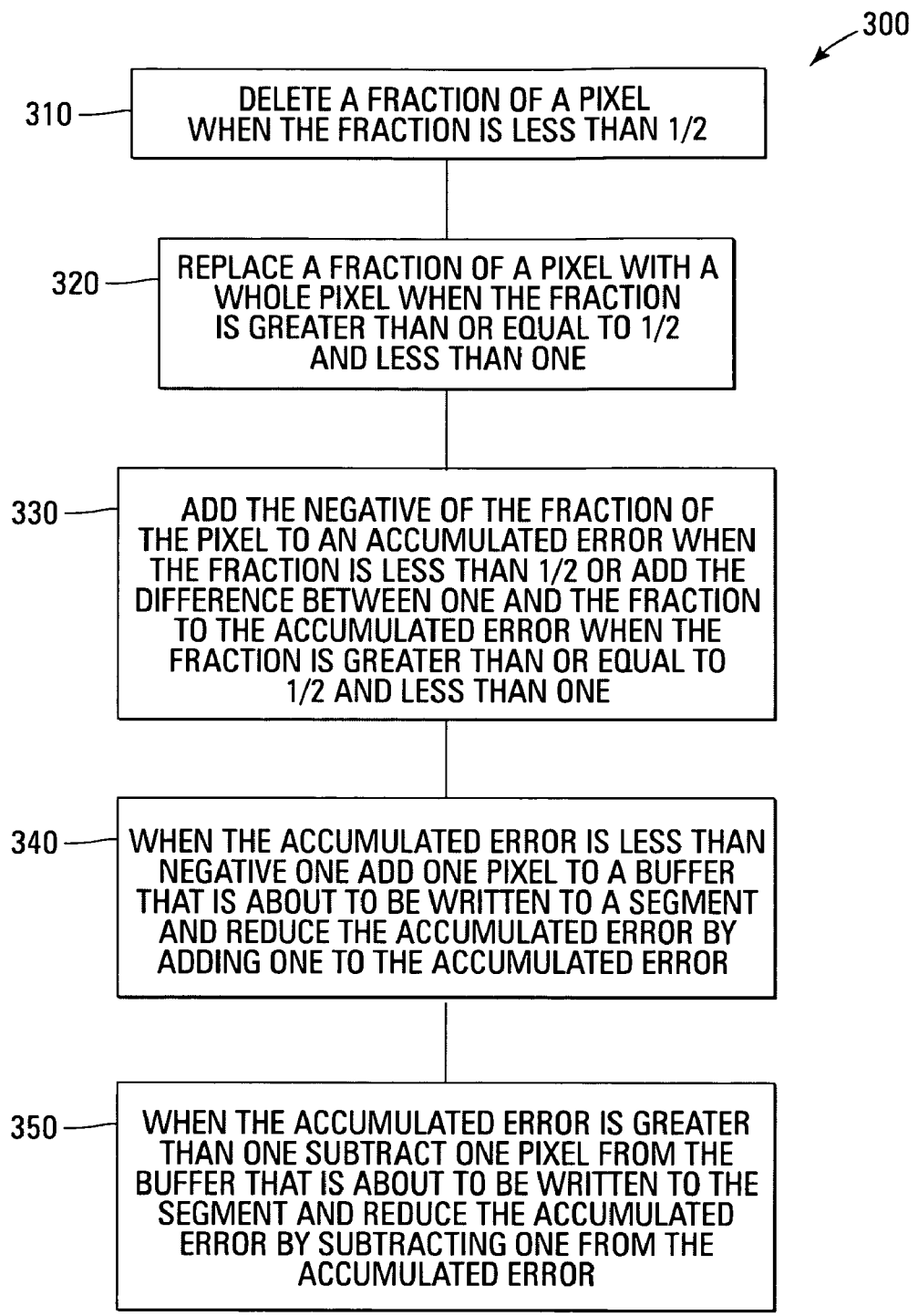
FIG. 3 is a flowchart of an embodiment of a method, according to an embodiment of the invention.

As indicated above, individual segments 120 may have a fractional portion of a pixel at their ends just before a seam 130. FIG. 3 is a flowchart of a method 300 for handling fractional pixels, according to an embodiment. For one embodiment, either host 250 or controller 230 computes a length of a spiral segment 120 that is about to be written and multiplies the segment length by the number of pixels per unit length to determine the number of pixels that can be contained in segment 120. If the number of pixels includes a fraction of a pixel that is less than ½, the fraction of a pixel is deleted at block 310 of FIG. 3, or in other words the number of pixels is rounded down. If the number of pixels includes a fraction of a pixel that is greater than or equal to a ½ the fraction of a pixel is replaced with a whole pixel, or in other words the number of pixels is rounded up, at block 320. For various embodiments, host 250 or controller 230 may perform blocks 310 and 320.

At block 330, the negative of the fraction is added to an accumulated error for a fraction of a pixel that is less than ½, or a difference between one and the fraction is added to the accumulated error for a fraction of a pixel that is greater than or equal to a ½ and less than one. For a fraction of a pixel that is less than ½, the fraction is denoted as the pixel error and thus the negative of the pixel error is added to the accumulated error. For a fraction of a pixel that is greater than or equal to a ½ and less than one, the pixel error is a difference between one and the fraction and thus the pixel error for this case is added to the accumulated error.

At block 340, when the accumulated error is less than negative one, one pixel is added to a buffer that contains the data for the segment to be written, and the accumulated error is reduced by adding one to the accumulated error. Adding a pixel to the buffer may be accomplished by duplicating the last whole pixel in the buffer that can be written. However, this is not limited to the last pixel, but any pixel in the buffer can be duplicated. At block 350, when the accumulated error is greater than one, one pixel is deleted from the buffer that contains the data for the segment to be written, and the accumulated error is reduced by subtracting one from the accumulated error. The pixel that is deleted is not limited to the last pixel in the buffer, but can be any pixel in the buffer.

Note that when the accumulated error is less than negative one, rounding the fractions of the pixels has resulted in a loss of more than one whole pixel, and one whole pixel is added back to the buffer to be written and can be written to the disc, thus reducing the magnitude of the accumulated error. When the accumulated error is greater than one, rounding the fractions of the pixels has resulted in a gain of more than one whole pixel, and one whole pixel is deleted from the buffer to be written, thus reducing the magnitude of the accumulated error.

For one embodiment, controller 230 performs blocks 330-350 of method 300. For another embodiment, blocks 330-350 are a portion of a method for preparing a buffer for writing to along a segment. Data corresponding to a write command is then loaded into a buffer. If a segment is not currently being written, for one embodiment, then the buffer is prepared for writing to the next segment.

Following is an example of handling fractional pixels according to an embodiment of method 300 of FIG. 3: Assume that the six consecutive segments are respectively 3524.51, 3538.65, 3542.79, 3546.49, 3551.48, and 3555.42 pixels long. According to blocks 310 and 320 of FIG. 3, the respective segments become 3525 3539, 3543, 3546, 3551 pixels, and 3555 pixels. According to block 330 the respective errors are $(1-0.51)=0.49$ pixels; $(1-0.65)=0.35$ pixels; $(1-0.79)=0.21$ pixels; 0.49 pixels; 0.48 pixels; and 0.42 pixels. Therefore, according to blocks 330-350, the first segment is 3525 pixels and the accumulated error 0.49 pixels, the second segment 3539 pixels and the accumulated error $(0.49+0.35)=0.84$ pixels, and the third segment 3543 pixels and the accumulated error $(0.84+0.21)=1.05$ pixels. Note that the accumulated error for the third segment exceeds one, so 1 pixel is subtracted from the third segment, giving 3542 pixels, and 1 pixel is subtracted from the accumulated error, giving 0.05 pixels. The fourth segment is 3546 and the accumulated error $(0.05-0.49)=-0.44$ pixels, the fifth segment 3551 pixels and the accumulated error $(-0.44-0.48)=-0.92$, and the sixth 3555 pixels and the accumulated error $(-0.92-0.42)=-1.34$. Since the accumulated error is less than $-1$, 1 pixel is added to the sixth segment, giving 3556 pixels, and 1 is added to the accumulated error giving $-0.34$ pixels.

CONCLUSION

Although specific embodiments have been illustrated and described herein it is manifestly intended that the scope of the claimed subject matter be limited only by the following claims and equivalents thereof.

What is claimed is:

1. A method of producing a label on a rotating medium, comprising:

disposing optically visible marks on the rotating medium to form a plurality of tracks of the optically visible marks, wherein the plurality of tracks include a plurality of seams, wherein each seam separates an end of a track from the beginning of another track;

locating the seams at different angular locations on the rotating medium so that the tracks begin at different angular locations on the rotating medium;

accumulating an error caused by rounding fractions of the marks up or down so that whole marks are disposed on the rotating medium, wherein the accumulated error includes an error for a track that is being written to and any errors for different tracks that were previously written to;

disposing one extra whole mark on the rotating medium when the accumulated error corresponds to rounding down by more than one whole mark; and disposing one less whole mark on the rotating medium when the accumulated error corresponds to rounding up by more than one whole mark.

2. The method of claim 1, wherein at least some seams start at different spokes of the rotating medium.

3. The method of claim 2, wherein the spokes are used for controlling a rotational speed of the rotating medium.

4. The method of claim 2, wherein locating the seams comprises locating the seams at successive spoke locations.

5. The method of claim 1, wherein the seams are formed by a pause in disposing the marks.

6. The method of claim 1, wherein locating the seams comprises distributing the seams according to a random pattern, a Brownian pattern, or a fixed pattern.

7. The method of claim 1, wherein disposing optically visible marks comprises disposing optically visible first marks of a first track, the method further comprising buffering data corresponding to optically visible second marks for a second track while disposing the optically visible first marks of the first track.

8. The method of claim 1, wherein disposing optically visible marks on the rotating medium to form a track of the optically visible marks is in response to arriving at a spoke on the rotating medium.

9. A method of operating an optical drive configured for producing optically visible marks on spiral tracks of a rotating medium, comprising:

accumulating an error as the spiral tracks are written, the error caused by rounding fractional portions of the marks up or down so that only whole marks are disposed on the rotating medium;

increasing a number of whole marks written on a spiral track by one whole mark when the accumulated error corresponds to at least one less whole mark; and decreasing a number of whole marks written on a spiral track by one whole mark when the accumulated error corresponds to at least one more whole mark;

wherein the accumulated error includes an error for a spiral track that is being written to and any errors for different spiral tracks that were previously written to.

10. The method of claim 9, wherein accumulating an error comprises rounding a fractional portion of a mark down when the fractional portion of the mark is less than ½ a mark.

11. The method of claim 9, wherein accumulating an error comprises rounding a fractional portion of a mark up when the fractional portion of the mark is greater than or equal ½ a mark and less than one mark.

12. The method of claim 9, wherein accumulating an error comprises adding the negative of a fractional portion that is rounded down to the accumulated error.

13. The method of claim 9, wherein accumulating an error comprises adding a difference between a whole portion and a fractional portion that is rounded up to the accumulated error.

14. The method of claim 9, wherein disposing one extra whole mark comprises adding the one extra whole mark to a plurality of whole marks disposed along a spiral segment on the rotating medium.

15. The method of claim 9, further comprises, when the accumulated error corresponds to rounding down by more than one whole mark, adding a pixel of data corresponding to the one extra whole mark to a buffer containing a plurality of pixels of data before disposing the one extra whole mark on the rotating medium.

16. The method of claim 9 further comprises, when the accumulated error corresponds to rounding up by more than one whole mark, deleting a pixel of data corresponding to the one less whole mark from a buffer containing a plurality of pixels of data before disposing the one less whole mark on the rotating medium.

17. The method of claim 9 further comprises determining a number of marks that can be disposed along a spiral segment on the rotating medium before accumulating the error.

18. The method of claim 9 further comprises reducing the accumulated error by adding one to the accumulated error when disposing one extra whole mark on the rotating medium.

19. The method of claim 9 further comprises reducing the accumulated error by subtracting one from the accumulated error when disposing one less whole mark on the rotating medium.

20. A computer-usable medium containing computer-readable instructions for performing a method, comprising:
    disposing optically visible marks on the rotating medium to form a plurality of tracks of the optically visible marks, wherein the plurality of tracks include a plurality of seams, wherein each seam separates an end of a track from the beginning of another track;
    locating the seams at different angular locations on the rotating medium so that the tracks begin at different angular locations on the rotating medium;
    accumulating an error caused by rounding fractions of the marks up or down so that whole marks are disposed on the rotating medium, wherein the accumulated error includes an error for a track that is being written to and any errors for different tracks that were previously written to;
    disposing one extra whole mark on the rotating medium when the accumulated error corresponds to rounding down by more than one whole mark; and
    disposing one less whole mark on the rotating medium when the accumulated error corresponds to rounding up by more than one whole mark.

21. The computer-usable medium of claim 20, wherein, in the method, wherein at least some seams start at different spokes of the rotating medium.

22. The computer-usable medium of claim 20, wherein, in the method, disposing optically visible marks comprises disposing optically visible first marks of a first track and further comprising buffering data corresponding to optically visible second marks for a second track while disposing the optically visible first marks of the first track.

23. The computer-usable medium of claim 20, wherein, in the method, disposing optically visible marks on the rotating medium to form a track of the optically visible marks is in response to arriving at a spoke on the rotating medium.

24. An optical disc drive, comprising:
    a means for disposing optically visible marks on the rotating medium to form a plurality of tracks of the optically visible marks, wherein the plurality of tracks include a plurality of seams, wherein each seam separates an end of a track from the beginning of another track;
    a means for locating the seams at different angular locations on the rotating medium so that the tracks begin at different angular locations on the rotating medium;
    a means for accumulating an error caused by rounding fractions of the marks up or down so that whole marks are disposed on the rotating medium, wherein the accumulated error includes an error for a track that is being written to and any errors for different tracks that were previously written to;
    a means for disposing one extra whole mark on the rotating medium when the accumulated error corresponds to rounding down by more than one whole mark; and
    a means for disposing one less whole mark on the rotating medium when the accumulated error corresponds to rounding up by more than one whole mark.

25. The optical disc drive of claim 24, wherein disposing optically visible marks comprises disposing optically visible first marks of a first track and further comprising a means for buffering data corresponding to optically visible second marks for a second track while disposing the optically visible first marks of the first track.

26. An optical disc drive, comprising:
    a controller configured for causing the optical disc drive to perform a method, comprising:
        disposing optically visible marks on the rotating medium to form a plurality of tracks of the optically visible marks, wherein the plurality of tracks include a plurality of seams, wherein each seam separates an end of a track from the beginning of another track;
        locating the seams at different angular locations on the rotating medium so that the tracks begin at different angular locations on the rotating medium;
        accumulating an error caused by rounding fractions of the marks up or down so that whole marks are disposed on the rotating medium, wherein the accumulated error includes an error for a track that is being written to and any errors for different tracks that were previously written to;
        disposing one extra whole mark on the rotating medium when the accumulated error corresponds to rounding down by more than one whole mark; and
        disposing one less whole mark on the rotating medium when the accumulated error corresponds to rounding up by more than one whole mark.

27. The optical disc drive of claim 26, wherein, in the method, each seam starts at a different spoke of the rotating medium, wherein the spokes are used for controlling a rotational speed of the rotating medium.

28. The optical disc drive of claim 26, wherein, in the method, disposing optically visible marks comprises disposing optically visible first marks of a first track and further comprising buffering data corresponding to optically visible second marks for a second track while disposing the optically visible first mark of the first track.

* * * * *